United States Patent
Robu et al.

[11] Patent Number: 5,142,993
[45] Date of Patent: Sep. 1, 1992

[54] CONVEYING MEANS

[75] Inventors: Johann Robu, Olching; Rudolf Robl, Landsberg, both of Fed. Rep. of Germany

[73] Assignee: RSL Logistik GmbH & Co., Fed. Rep. of Germany

[21] Appl. No.: 668,996

[22] Filed: Mar. 13, 1991

[30] Foreign Application Priority Data

Mar. 16, 1990 [DE] Fed. Rep. of Germany ....... 9003123

[51] Int. Cl.⁵ ............................................. B65G 9/00
[52] U.S. Cl. ....................................... 105/148; 105/3; 213/75 R; 104/89
[58] Field of Search ............... 104/89, 93, 111, 122; 105/1.4, 3, 148, 150; 213/75 R, 77, 83, 94, 181; 198/465.4, 687.1

[56] References Cited

U.S. PATENT DOCUMENTS

| | | | |
|---|---|---|---|
| 160,133 | 2/1875 | West | 213/94 |
| 222,551 | 12/1879 | Van Why | 213/83 |
| 323,951 | 8/1885 | Newlon | 213/83 |
| 325,622 | 9/1885 | Neal | 213/83 |
| 506,543 | 10/1893 | Price | 213/94 |
| 755,652 | 3/1904 | Greenbury | 213/94 |
| 3,759,190 | 9/1973 | Harvey | 105/150 |
| 3,827,367 | 8/1974 | Paglia | 105/150 |
| 5,014,864 | 5/1991 | Richter et al. | 105/150 |

FOREIGN PATENT DOCUMENTS 0338100 10/1989 European Pat. Off. ............ 105/148

*Primary Examiner*—Robert J. Oberleitner
*Assistant Examiner*—Mark T. Le
*Attorney, Agent, or Firm*—Finnegan, Henderson, Farabow, Garrett & Dunner

[57] ABSTRACT

A conveying unit for a suspension conveying system having an elevated rail which unit includes two roller supports for rolling on a rail and a supporting element connected to the roller supports, on which the object to be conveyed are to be disposed. A coupling is provided in order to be able to couple the conveying unit to other conveying unit. In order to be able to better adapt the conveying unit to special operating conditions the coupling is arranged directly on the roller support.

16 Claims, 4 Drawing Sheets

CONVEYING MEANS

BACKGROUND OF THE INVENTION

1. Field of the Invention

The invention relates to a conveying means for a suspension conveying system of the type having an elevated rail and, in particular, to conveying means in the form of a unit including a pair of roller supports for engaging the rail, a support element from which objects to be conveyed are disposed, and a coupling element for coupling to other conveying units.

2. Description of the Prior Art

Such a conventional conveying means is e.g., revealed by DE-PS 19 40 256.

The coupling elements are always fastened to the supporting elements designed as tie-bars in the known conveying means of this type. However, it appeared that the field of application and the usability of the known conveying means is restricted by this type of arrangement of the coupling elements, since the space required for the coupling is not available for the transport of objects.

SUMMARY OF THE INVENTION

Thus, the invention is based on the object of providing a conveying means or unit which can be better adapted to special needs.

The object is accomplished in the present invention by disposing the coupling elements directly on the roller supports.

The supporting element can be simple, adapted to the requirements in the enterprise, i.e., for instance the working height, the space requirements or the capacity, by the arrangement of the coupling elements according to the invention on the roller supports. The conveying units can moreover also be combined into a common train with different supporting elements. The curve-negotiating ability is further improved in vertical curves by the decreased distance between the coupling and the elevated track or rail, since less distortions occur in the train.

It is of special advantage if the coupling include a pair of coupling elements disposed on each roller support, namely at opposed sides of the roller support relative to the direction of conveying. It is possible in this fashion to also couple empty conveying units, in which one of the two roller supports is released from the rail in customary fashion and is downwardly suspended together with the supporting element, to form an empty train and to move them jointly.

The forming of an empty train can be carried out especially advantageously if the supporting element is connected to the roller support to be pivotably about a horizontal axis.

It is for instance possible by the arrangement of the coupling elements on the roller supports according to the invention, to utilize substantially the full train length for the transport of objects, by designing the supporting element so that it projects beyond the roller support. The ends of the supporting elements can be bent in C-shaped fashion or approximately in C-shaped fashion. The latter design has the further advantage that empty supporting elements can be suspended in space-saving fashion, by suspending them with one of their C-shaped end pieces e.g., over a supporting element of a conveying unit movable on a rail.

It is furthermore possible by the arrangement of the coupling elements according to the invention to connect the supporting element in vertically adjustable fashion with the roller supports so that the working height of the supporting element can be adjusted without having to uncouple the train for this purpose.

A constructionally especially simple solution for such an adjusting means is an elongated leg made e.g., of a wire loop where the ends of the supporting element are movable along the leg to a position adjacent the roller supports.

The coupling elements can be designed especially simple and robust by the arrangement on the roller support, since the horizontal-swing angles of the coupling elements with respect to each other, which are necessary for correct curve drives, are smaller than in the case of the coupling elements arranged on the supporting element.

However, this constructionally simple adjusting means is not only suitable for conveying means which can be coupled, but can also be used e.g., for conveying means which cannot be coupled.

A conveying means can be produced in especially simple fashion using a C- or V-shaped strap for the use together with the supporting element and a second roller support.

BRIEF DESCRIPTION OF THE DRAWINGS

Examples of embodiment of the invention are explained in greater detail in the following by means of the drawings in which.

DESCRIPTION OF THE PREFERRED EMBODIMENTS

Figure 1:
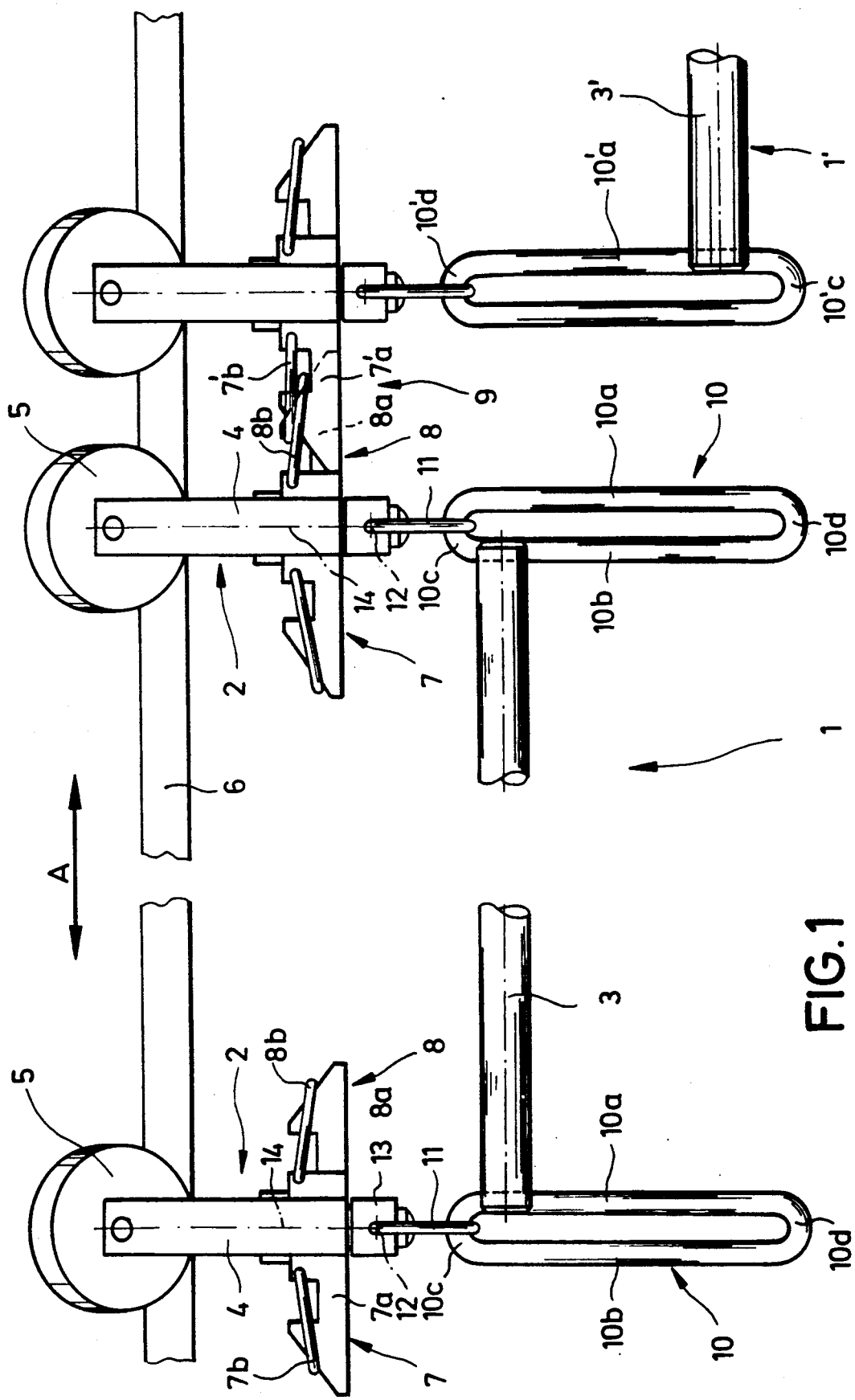
FIG. 1 shows a first embodiment of the invention.
Figure 5A:
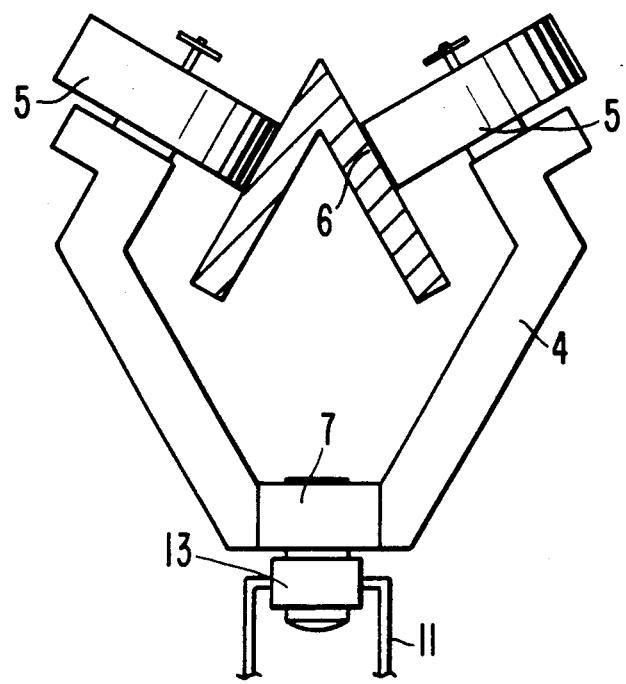
FIGS. 5A and 5B show schematic, alternative variations of the embodiment of FIG. 1 (end views) having a "V" shaped strap and a "C" shaped strap, respectively.
Figure 5B:
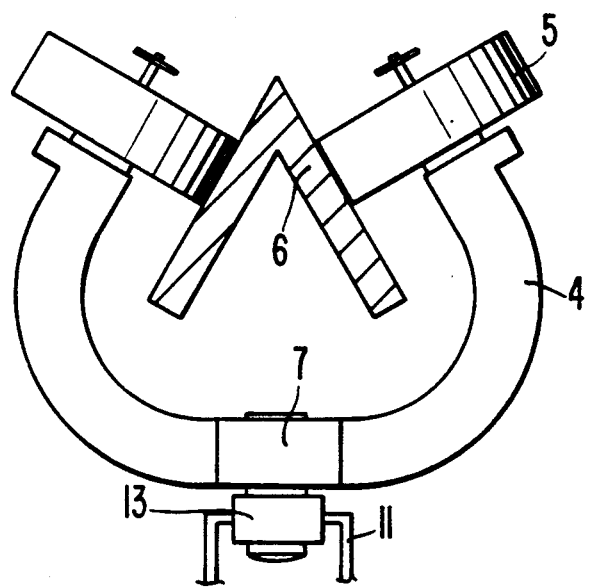

A conveying means 1 can be gathered from FIG. 1, which comprises two identically designed roller supports 2 and a supporting element connecting the roller supports 2 in the form of a rod-shaped tie-bar 3, on which articles of clothing hanging on hangers can be suspending. The supporting element can, however, also have other suited shapes. Each of the roller supports 2 contains a V- or C-shaped strap 4 of plastic material (see FIGS. 5A and 5B), Which extends perpendicular to the plane of the drawing and connects in each case two rollers disposed at an angle to each other, only one roller 5 being represented in each case and the other roller being located behind it perpendicular to the plane of the drawing. The rollers 5 roll in the direction of the double arrow A on a rail 6, which also comprises two tracks, in known fashion, which are disposed in roof-shaped fashion at the angle of the rollers of each strap and of which again only one track is shown.

Coupling elements 7, 8 each of a commercially available coupling 9 consisting of two elements and coupling automatically is disposed at two transverse sides of each roller support 2 which are opposite to each other in the direction of conveying A. Both coupling elements 7, 8 consist of plastic material and are preferably produced in one piece with the strap 4. As outlined in FIG. 1 the coupling 9 serves for coupling the conveying means 1 to a further conveying means 1' to form a conveying train. The coupling elements 7, 8 consist in known fashion of two identically designed hooks 7a or 8a fastened at a distance to the strap 4 perpendicular to the plane of the drawing and one pivotable strap 7b or 8b each, which extends in the direction perpendicular to the plane of the drawing such that is engages e.g. over the hook 8a of the conveying means 1 and the hook 7a' of the conveying means 1'. The strap 7b' of the conveying means 1' is analogously designed so that it also engages over both hooks. The straps 7b, 8b can be lifted by a inclined surface of an adjacent hook of the coupling means so that an automatic coupling is possible by a movement of the two conveying means 1 and 1' to be coupled towards each other. The hooks of a coupling 9 are displaced relative to each other in the direction perpendicular to the plane of the drawing in coupled condition so that cornering through horizontal curves (i.e., curves in a horizontal plane) is not hindered. During cornering through vertical curves the coupling elements are located substantially closer to the curve center than in the case of the arrangement on a tie-bar so that the curve-negotiating ability is decisively improved.

Both ends of the tie-bar 3 are connected in each case with a deflection-resistant wire loop 10. The wire loop 10 comprises two long, linear legs 10a, 10b extending parallel to each other and two substantially semicircular wire arches or loop ends 10c, 10d connecting the legs 10a, 10b in each case with each other at their ends. The tie-bar 3 is fastened in each case to the inwardly pointing, long leg 10a, 10b distant from its mid point and near the wire loop end 10c. A pivoting strap 11 or a detachable fastening clip (spring hook or the like) is loosely guided through each of the wire loops 10, which strap is disposed on the roller support 2 rotatably about a horizontal axis 12 extending perpendicular to the direction of conveying A. The wire loop 10 thus acts as an adjusting means for the distance of the tie-bar 3 from the rail 6, i.e., the working height of the tie-bar 3. For this purpose, the pivoting straps 11 of the conveying means are slightly pressed outwardly and away from each other so that it is possible to reverse the wire loop so that optionally either the wire loop end 10c or the wire loop end 10d is suspended on the pivoting strap 11. If the wire loop end 10c is suspended on the pivoting strap 11, the tie-bar 3 has a relatively short distance to the rail, while the distance can be enlarged as it is shown by means of the conveying means 1', if the wire loop end 10d is suspended on the pivoting strap 11.

The pivoting strap 11 is mounted in a rotary element 13, which is rotatably about a vertical axis 14 on the strap 4. If empty conveying means 1 are to be transported, one of the two roller supports 2 of each empty conveying means 1 can be removed from the rail. Due to the loose arrangement of the wire loop 10 on the pivoting strap 11 the tie-bar 3 will be downwardly suspended with the roller support 2 being released. Due to the rotatability about the axis 14 the released roller supports 2 and the tie-bar 3 can be rotated to the side so that they do not hinder coupling of the roller supports 2 of the empty conveying means which are now located side by side and are still in engagement with the rail 6. In this fashion, empty conveying means can also be transported in the train.

Figure 2:
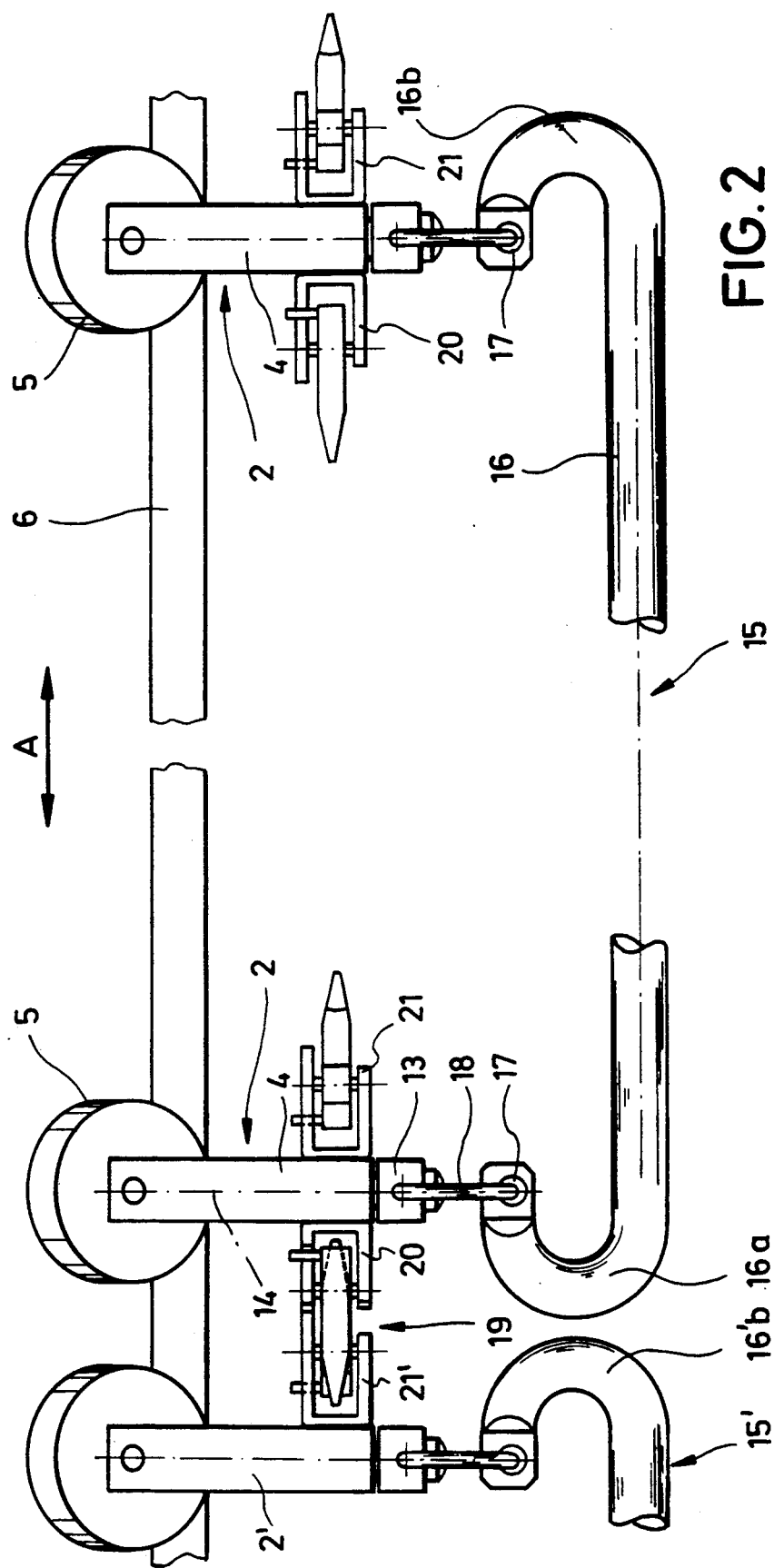
FIG. 2 shows a second embodiment of the invention.

FIG. 2 shows a further conveying means 15 which differs from the conveying means 1 of FIG. 1 by a different design of the tie-bar 16 and a modified coupling 19. To simplify the explanation, components comparable to the first embodiment are provided with the same reference numerals and not explained again. The ends of the tie-bar 16 have C-shaped end pieces 16a and 16b bent, which end pieces project beyond the respectively associated roller supports 2 in the direction of conveying A such that the entire space required for the coupling 9 between the conveying means 15 or 15' is substantially available for the transport of objects. The free ends of the C-shaped end pieces 16a and 16b contain a bore 17 through which a strap 18 extends loosely. The strap 18 can be designed analogously to the pivoting strap 11 and be pivotable on the rotary element 13 of the roller support 2. However, the strap 18 should be sufficiently long that the tie-bar 16 can pivot in a vertical if a roller support 2 of the conveying means 15 is removed from the rail 6.

Figure 3:
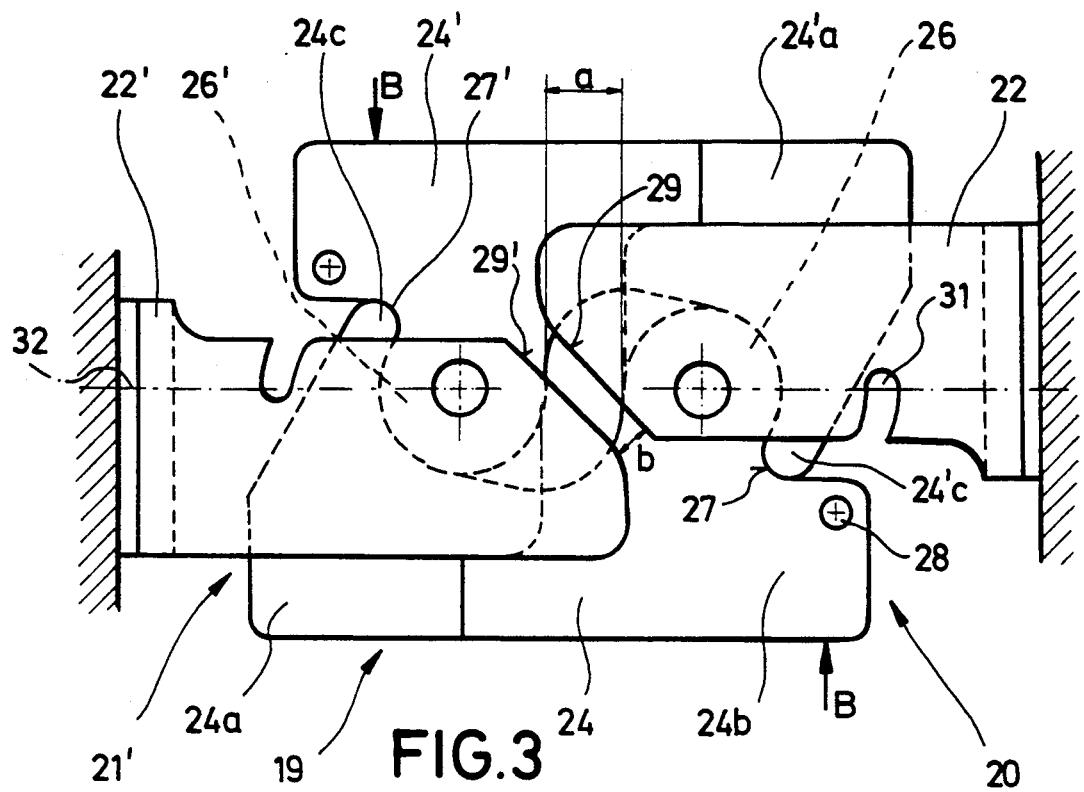
FIG. 3 shows an enlarged top view of a coupling means.
Figure 4:
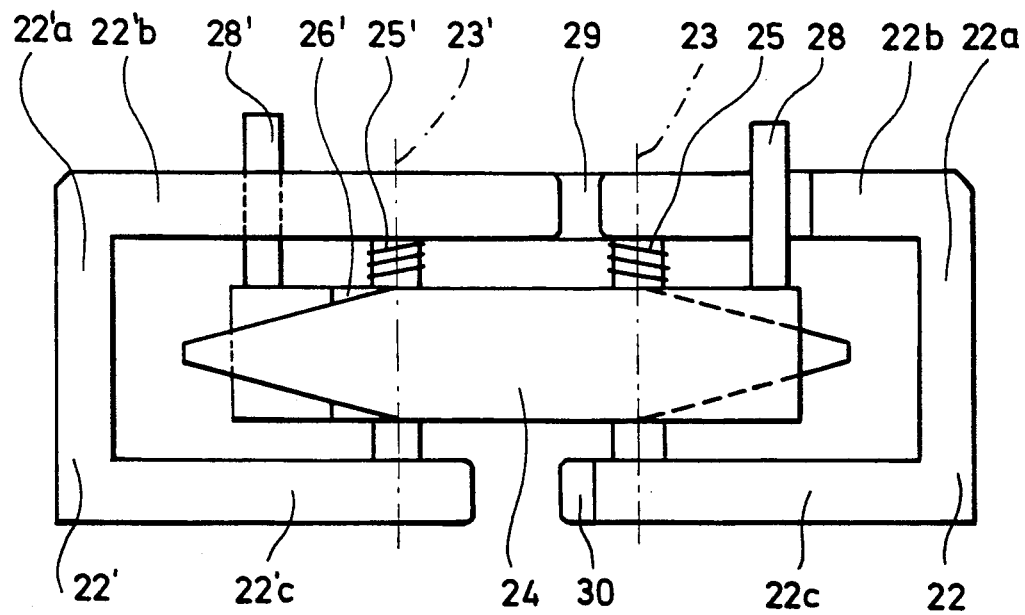
FIG. 4 shows a lateral view of FIG. 3.

The coupling 19 contains in each case two identically designed coupling elements 20 and 21, which are, however, rotated by 180 degrees, on both sides of the strap 4 of the roller support 2. Both coupling elements 20 and 21 point in the direction of conveying A as can be seen from FIGS. 3 and 4. Coupling 19 is represented in FIGS. 3 and 4, by elements 20 and 21' which connects the conveying means 15 with the conveying means 15' of FIG. 2. For reasons of clearness, the coupling element 20 of this coupling is explained at first in greater detail, the corresponding components of the coupling element 21' being provided with the same reference numeral, but supplemented by an apostrophe. The coupling element 20 consists of a U-shaped base element 22 which is disposed detachably or fixedly in a vertical direction on the strap 4 of the roller support 2 with its web 22a or is injection moulded in one piece if plastic material is used. A hook 24 is pivotable in a horizontal plane about a pin 23 disposed between the upper leg 22b and the lower leg 22c. As is shown by FIG. 4, the hook 24 is smaller than the distance between the legs 22b, 22c of the base element 22. A leg spring 25 is disposed around the pin 23, and is anchored with one end in the upper leg 22b and with its other end in the hook 24. The leg spring 25 is disposed in such fashion that it can return the hook from any pivoted position into the coupling position shown in FIG. 3. The pin 23 is fastened in a hub 26 of the hook 24. The outer diameter of hub 26 is sized in relation to the opening of the hook 24 that it can be encompassed with clearance by the opening of the hook 24' of the corresponding coupling element 21'. The cross-section of the hook 24 tapers forwardly in its front area 24a located on the other side of the axis of rotation 23 seen from the roller support 2 so that a triangular or trapezoidal plane is shown in a longitudinal section. A pressure surface 27 for the hook tip 24c' of the corresponding coupling element 21, is provided on the hook in the rear area 24b in a position between the axis of rotation 23 and the web 22a. A pin 28 is likewise disposed on the hook 24 in the rear area 24b of the hook 24 between the pin 23 and the web 22a, which projects upwardly beyond the surface of the hook and beyond the upper leg 22b and serves for releasing the coupling.

The upper leg 22b of the base element 22 projects forwardly beyond the lower leg 22c, at least across part of its width. The front surface of the upper leg 22b extends obliquely to the direction of conveying A at least across an area 29. The front surface of the lower leg 22c also comprises a sloped area 30 at least in the area of the slope 29. In area 30, the upper leg 22b does not project beyond the lower leg 22c. A groove 31 is provided in the upper leg into which the pin 28 can engage upon a pivoting of the hook.

The corresponding coupling elements 20, 21' are disposed in such fashion on their respective roller supports 2, 2' that the pins 23 and 23' are located on a straight line 32, which extends parallel to the direction of conveying A on the rail 6. The hook tips 24c and 24c' extend beyond the straight line 32 so that the respective hubs 26 or 26' can be reliably encompassed. The hook tips 24c, 24c' rest against the corresponding pressure surfaces 27, 27' in coupled condition. The coupling elements 20, 21' are dimensioned in such fashion that the hubs 26, 26' have a distance a and the slopes 29, 29' have a distance b to each other in coupled condition as depicted in FIG. 3. Due to both distances and the tapering cross-section of each hook in its front area the coupling elements 20, 21' can tilt against each other upon the passing of vertical curves, and it is possible to master tilted positions of about 15 degrees from a horizontal hook alignment without any problems. If horizontal curves are passed, the hook of the roller support leading into the curve is pivoted about its axis of rotation, whereby its position is changed with respect to the hub of the corresponding coupling element. However, due to the hook tips 24c, 24c' which are in abutment against the pressure surfaces 27 or 27', the hook of the corresponding element is analogously deflected so that the coupling cannot be released. Since the roller supports also can be adjusted relative to the center of curvature of the curve, horizontal swings of the two coupling elements to each other are possible in the range between 30 and 45 degrees.

For the release of the coupling it is sufficient to press the pin 28 or 28' of one of the two coupling elements 20, 21' through a suitable guide in the direction towards the straight line 32 so that the pin can engage the groove 31 or 31'. Due to this action, the actuated hook pivots out of its engagement with the hub and also presses the hook of the corresponding coupling element out of the engagement with its hub via the pressure surface 27 or 27'. The same release effect is achieved if manual pressure is exerted on one of the hooks in the direction of the arrow B in FIG. 3.

The coupling can either be carried out manually by pivoting the hooks or automatically by moving the roller supports provided with the coupling elements to be coupled against each other. The sloped front surfaces of the hooks are pushed against each other and press themselves mutually into a position from which they can engage over the respectively opposite hub supported by the leg spring 25, 25'.

Various modifications can be made in the disclosed embodiments without departing from the scope or spirit of the invention. The conveying means according to FIG. 1 can e.g., be provided with the coupling according to FIG. 2 or the conveying means according to FIG. 2 can be provided with the coupling according to FIG. 1. The use of other known couplings is also possible. If the transport of empty conveying means is not necessary or must not be imperatively carried out in space saving fashion, it is possible to provide the elements of a coupling in customary fashion only at the beginning and at the end of the conveying unit. The adjustment means can e.g., contain a rehangable, C-shaped support or a support which can be inserted at different height instead of the wire loop. More than two adjustment positions can furthermore be provided. The adjusting means according to the invention can further-more also be used for conveying units which do not necessarily comprise the arrangement of the coupling means or do not comprise any coupling means. U-shaped or other suited end pieces can also be used instead of the C-shaped end pieces. Finally, it is quite possible to also use the strap-shaped roller supports of plastic material with injection moulded coupling elements for other conveying means.

We claim:

1. A conveying unit for a suspension conveying system adapted to be operated by pushing and pulling forces, the system including an elevated rail defining a conveying direction, the unit comprising: two roller supports for rolling on the rail, each of the roller supports including two rollers adapted to engage the rail at upwardly facing surfaces thereof and a strap interconnecting the two rollers transversely to the conveying directions and having a mid portion which is arranged essentially below the rail when the unit is suspended on the rail for transport; a supporting element on which objects to be conveyed are to be disposed, the supporting element being connected to the straps of the two roller supports and arranged between the roller supports; and at least one coupling element for coupling to a corresponding coupling element of another conveying unit, the coupling element being rigidly connected to the mid portion of the strap of one of the roller supports at a location between the supporting element and the rollers.

2. The conveying unit according to claim 1, wherein said strap of said one of the roller supports is C-shaped.

3. The conveying unit according to claim 1, wherein two coupling elements are disposed on said one roller support, wherein a first of said two coupling elements is disposed at one side of said one roller support and a second of said two coupling elements is disposed at the opposite side of said one roller support relative to the conveyance direction.

4. The conveying unit according to any one of claims 1 or 3, further including pivot means having a horizontally disposed pivot axis and interconnecting said supporting element with one of said roller supports, wherein the supporting element is pivotable in a vertical direction on said one of said roller supports.

5. The conveying unit according to any one of claims 1 or 3, wherein the supporting element projects beyond the roller supports in the direction of conveying.

6. The conveying unit according to claim 5, wherein the supporting element includes substantially C-shaped end pieces connected to the roller supports.

7. The conveying unit according to any one of claims 1 or 3, wherein the supporting element is connected with the roller supports via adjusting means for changing the distance between the supporting element and the rail.

8. The conveying unit according to claim 1, wherein each coupling element comprises a base element rigidly connected with the respective roller support and a hook provided with a hub and disposed in the base element pivotably about an axis of rotation in the horizontal direction, the hubs of each coupling element being encompassed by the hook of the corresponding coupling element when in the coupled condition.

9. The conveying unit according to claim 8, wherein each hook comprises a forwardly tapering cross-section in a front area extending in the direction towards the corresponding coupling element.

10. The conveying unit according to claim 8, wherein each hook includes a front area configured for engagement with a rear area of the respectively corresponding coupling element, which rear area is located between the hub and the roller support.

11. A conveying unit for a suspension conveying system including an elevated rail, the unit comprising two roller supports for rolling on the rail, a supporting element spaced a distance from said rail and connected between the roller supports, on which supporting element objects to be conveyed are to be disposed, and at least one coupling element for coupling to a corresponding coupling element of another conveying unit, wherein the coupling element is disposed on one of said roller supports, wherein the supporting element is connected with the roller supports via adjusting means for changing the distance between the supporting element and the rail, and wherein the adjusting means includes an oblong leg to which the supporting element is eccentrically fastened, and wherein both ends of the leg are selectively movable into positions adjacent to the roller supports.

12. The conveying unit according to claim 11, wherein the leg is loop-shaped.

13. A conveying unit for a suspension conveying system having an elevated rail defining a conveyance direction, the unit comprising two roller supports for rolling on the rail, a supporting element spaced a distance from the rail and positioned between the roller supports, and a pair of oblong legs each associated with a respective roller support for interconnecting the supporting element to the roller supports, each of said oblong legs having opposed ends and a mid point, wherein the supporting element is connected to each oblong leg at a position spaced from the mid point thereof, and said oblong legs constituting an adjusting means, wherein both ends of each of said oblong legs are selectively connectable to the respective roller support whereby the distance between the supporting element and the rail can be adjusted.

14. The conveying unit according to claim 12, wherein the leg is loop-shaped.

15. The conveying unit for a suspension conveying system according to claim 1, wherein said strap of said one of the roller supports is V-shaped.

16. The conveying unit according to claim 15, wherein two corresponding coupling elements are disposed at opposing sides of the strap in the conveyance direction.

* * * * *